United States Patent [19]

Cook

[11] 4,340,993
[45] Jul. 27, 1982

[54] ELECTRICAL STIMULATION BAR FOR AN ANIMAL CARCASS

[75] Inventor: Franklin M. Cook, San Mateo, Calif.

[73] Assignee: LeFiell Company, San Francisco, Calif.

[21] Appl. No.: 123,479

[22] Filed: Feb. 21, 1980

[51] Int. Cl.³ .............................................. A22C 9/00
[52] U.S. Cl. .......................................... 17/25; 17/1 E
[58] Field of Search .................................... 17/25, 1 E

[56] References Cited

U.S. PATENT DOCUMENTS

| 2,544,681 | 3/1951 | Harsham et al. | 17/25 UX |
| 2,544,724 | 3/1951 | Rentschler | 17/25 UX |
| 4,221,021 | 9/1980 | Swilley | 17/25 X |

FOREIGN PATENT DOCUMENTS

| 125258 | 11/1931 | Austria | 17/1 E |
| 1478258 | 6/1977 | United Kingdom | 17/1 E |

*Primary Examiner*—Willie G. Abercrombie
*Attorney, Agent, or Firm*—Kinney and Schenk

[57] ABSTRACT

An apparatus for applying an electrical stimulation to an animal carcass using an elongated bar which is movable between a first position in which the bar is in contacting relationship to the carcass and a second position in which the bar is disposed within a sterilization chamber.

10 Claims, 8 Drawing Figures

ELECTRICAL STIMULATION BAR FOR AN ANIMAL CARCASS

The invention relates generally to tenderization of meat suitable for human consumption and more particularly concerns a method and apparatus of applying an electrical stimulation to an animal carcass. The invention will be disclosed in connection with an electrical stimulation bar which is moved between a first contacting position with an animal carcass in which electrical energy is applied to the carcass and in a second position in which the bar is disposed in a sterilization chamber.

Electrical stimulation is one of a variety of methods which have been used in the prior art to tenderize meat products. Most generally the prior art devices have applied an electrical charge to an animal carcass through a probe which was manually manipulated to contact carcasses passed on a rail mounted trolley. An example of such a probe and of the conventional method of applying an electrical stimulus to an animal carcass is disclosed in U.S. Pat. No. 2,544,861 to Harshan et al. wherein electrodes on opposite sides of the carcass are stuck into each of the four legs and the neck of the carcass. Similarly, U.S. Pat. No. 2,544,724 discloses probes which are embedded in the carcass as it is passed over a trolley.

The insertion of a probe into an animal carcass generally requires a worker for placement of the probe and this worker is required to maintain contact as the carcass contorts under the impetus of the electrical energy. When the probe is inserted manually, care must be taken to insure that the carcass does not jerk into the worker causing injury.

The disadvantages of having a worker manually insert or embed a probe into an animal carcass has obvious disadvantages in a production environment. In addition to the labor costs necessitated by the required human operator, it is necessary to maintain a production line at a rate which was limited by the efficient working capabilities of the human operator. Further, when the carcass was to be used for human consumption, it was necessary for the worker to sterilize each of the four probes as they were pulled from one carcass and before they were inserted into the succeeding one in order to prevent any possible cross contamination of the meat. This added requirement put even further time restraints on the production line.

A method and apparatus for high production rates is shown in co-pending U.S. patent application Ser. No. 043,792, filed May 30, 1979, now U.S. Pat. No. 4,221,021. This co-pending application discloses a continuous tract or belt which contacts an animal carcass and applies an electrical stimulation thereto. This continuous tract apparatus has proved to be most suitable for high production rates. However, applicant has discovered that a new and novel method and apparatus which involves fewer working parts is more suitable for intermediate production rates. Further, this new and novel apparatus permits electrical stimulation of the breast portion of an animal carcass without resulting disadvantages. Like the method and apparatus of the aforementioned pending application, the present invention provides for automatic electrical stimulation of an animal carcass without the necessary intervention of a human operator. The present invention also provides for sterilization of all components of the apparatus which come into contact with a particular carcass prior to subsequent contact with another carcass.

Accordingly, it is a primary object of the present invention to provide a method and apparatus suitable for applying an electrical stimulation to an animal carcass at intermediate production levels.

It is a further object of the present invention to provide a method and apparatus for electrical stimulation of an animal carcass at an intermediate production rate with a reduced number of parts.

It is a further object of the present invention to provide an apparatus which is adapted to stimulate the breast portion of an animal carcass.

It is a further object of the present invention to provide an apparatus for applying an electro-stimulation to an animal carcass which prevents any possible cross contamination between the carcasses.

SUMMARY OF THE INVENTION

In accordance with the invention, an electrically conductive contact bar is moved to a contacting relationship with an animal carcass to apply an electrical stimulation to the carcass. A transport mechanism is operative to move the animal carcass along a predetermined path proximal to the electrically conductive contact bar. The contact bar is movably mounted between first and second positions, the first position being in contacting relationship with the carcass and the second position disposing the contact bar within a sterilization chamber which sterilizes the contact bar for subsequent contact with a succeeding animal carcass which is moved along the predetermined path. In the preferred embodiment, the contact bar is rotated about the axis of an elongated actuating shift which is rotated in response to the position of the animal carcass along the predetermined path by a fluid cylinder.

BRIEF DESCRIPTION OF THE DRAWINGS

Other objects and advantages of the invention will become apparent upon reading the following detailed description upon reference to the drawings, in which.

While the invention will be described in connection with a preferred embodiment and procedure, it will be understood that it is not intended to limit the invention to that embodiment or procedure. On the contrary, it is intended to cover all alternatives, modifications, and equivalents as may be included within the spirit and scope of the invention as defined by the appended claims.

DETAILED DESCRIPTION OF THE PREFERRED EMBODIMENT

Figure 1:
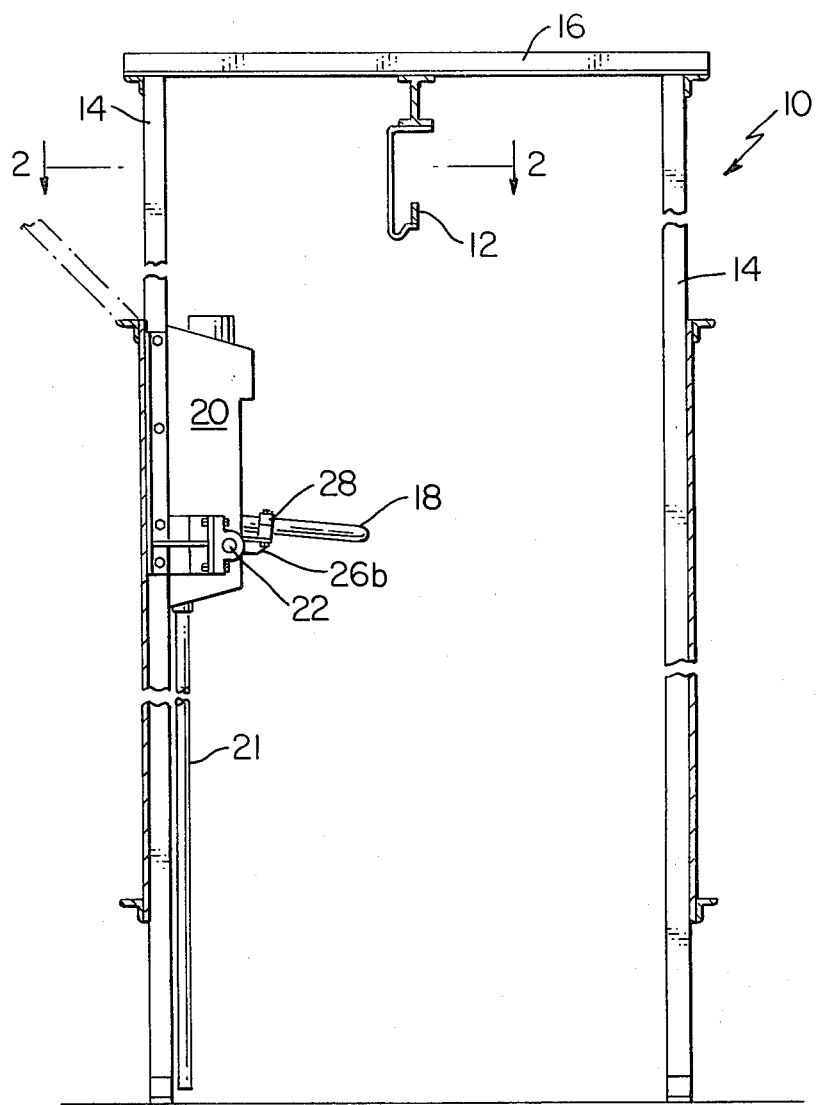
FIG. 1 is a side elevational view of a structure for transporting an animal carcass in contacting relationship with an electrical stimulation bar.

Referring now to the drawings and to FIG. 1 in particular, the support structure, generally designated as 10, is shown supporting a track 12 upon which a suspended animal carcass is slidingly or rollingly transported. The support structure 10 includes a plurality of vertical supports or sidewalls 14 which in turn maintain horizontal supports 16. The track 12 is affixed to the horizontal support 16 and defines a predetermined path along which the carcasses are moved or transported by a trolley (not shown) or the like.

An electrical stimulation bar 18 and a sterilization chamber 20 are supported upon one of the vertical sidewalls 14. As perhaps most clearly illustrated in FIGS. 3 and 4, the sterilization bar is movable between the first and second positions. The first or extended position is illustrated in FIG. 3. This position, which is also illustrated in the plan view of FIG. 2, positions the electrical stimulation bar 18 in contacting relationship with an animal carcass (not shown) hanging from a trolley or track 12. As will be explained in greater detail later, electrical energy is supplied to the stimulation or contact bar 18 when it is in contacting relationship with the animal carcass in this illustrated position of FIGS. 2 and 3.

Figure 3:
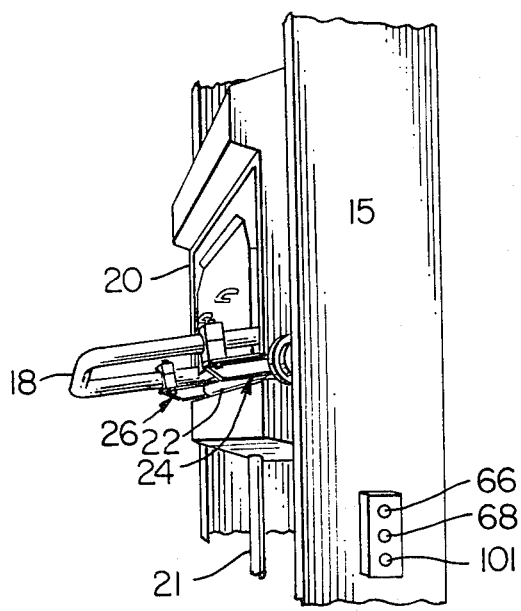
FIG. 3 is a perspective view of the side of the structure of FIG. 1 illustrating the electrical stimulation bar in an extended position away from its sterilization chamber.
Figure 4:
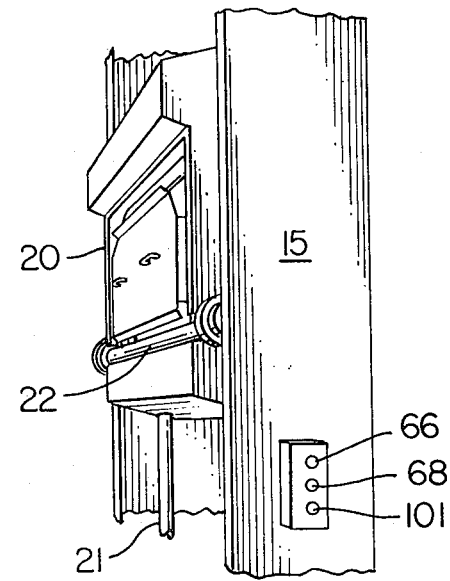
FIG. 4 is a perspective view similar to FIG. 3 but illustrating the stimulation bar in a retracted position disposed within a sterilization chamber.

FIG. 4 illustrates a second or retracted position of the stimulation or contact bar 18 when it is disposed within the sterilization chamber 20. When the stimulation bar 18 is in the second position, it is exposed to high temperature steam which serves to sterilize the contact bar 18 before it is returned to the first position illustrated in FIG. 3 for contact with a subsequent animal carcass. A drain 21 is shown extending from beneath the sterilization chamber 20 for the return of condensed water from the sterilization cabinet 20 to an appropriate location.

Figure 6:
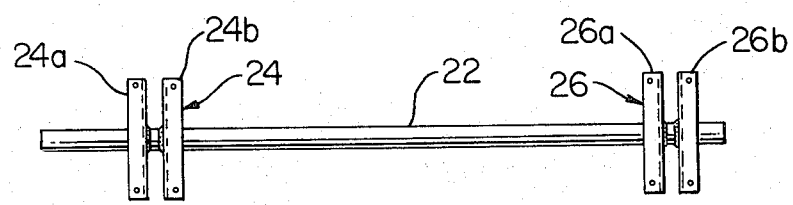
FIG. 6 is a plan view of the actuating shaft of FIG. 5 illustrating support angles affixed thereto.

FIG. 6 shows an actuating shaft 22 which is used to move the sterilization or contact bar 18 of the preferred embodiment between first and second positions. The actuating shaft 22 is elongated with two pairs of angle blocks 24 and 26 secured proximal to its end portions. The first set of angle blocks 24 incudes blocks 24a and 24b while the second set of blocks includes blocks 26a and 26b. In the embodiment illustrated, these angle blocks are welded to the actuating shaft 22.

Figure 5:
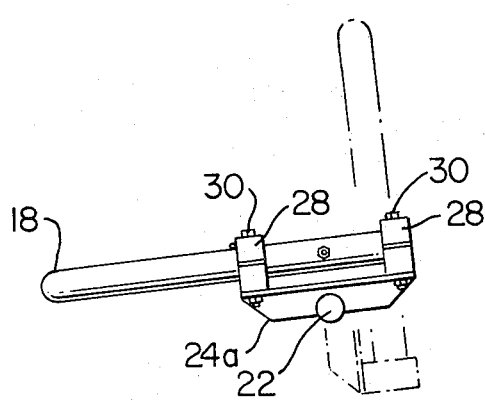
FIG. 5 is a side elevational view of the electrical stimulation bar of FIGS. 1-4 showing the manner in which the bar is rotated about an actuating shaft.

FIG. 5 depicts a side view of the actuating shaft 22 and one of the angle blocks 24a affixed to the actuating shaft 22. Plastic pipe mounting clamps 28 are secured to the angle supports through the agency of bolts 30. The mounting clamps 28 are of plastic material and are split to sandwich the sterilization bar 18 between the component parts of the clamps 28. The plastic material from which the mounting clamps 28 are formed serves to electrically insulate the electrical stimulation bar 18, which is constructed of stainless steel, from the angle blocks 24, 26 and the actuating shaft 22.

As suggested by the depiction of FIG. 5, the electrical stimulation of contact bar 18 is moved between first and second positions in accordance to the rotation of the actuating shaft 22. The solid line depiction in FIG. 5 is representative of the first or extended position of the bar 18, whereas the phantom or dotted line depiction is representative of the second or retracted position in which the electrical stimulation bar is disposed within the sterilization chamber 20.

Figure 2:
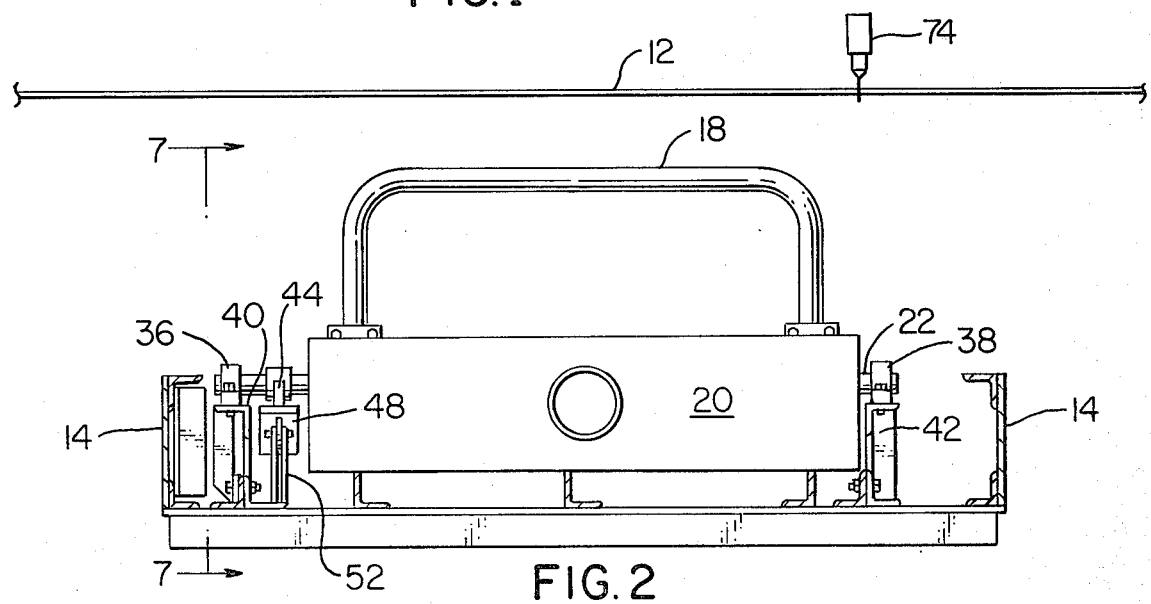
FIG. 2 is a partial plan view of the stimulation bar illustrated in FIG. 1 illustrating the stimulation bar in an extended position.
Figure 7:
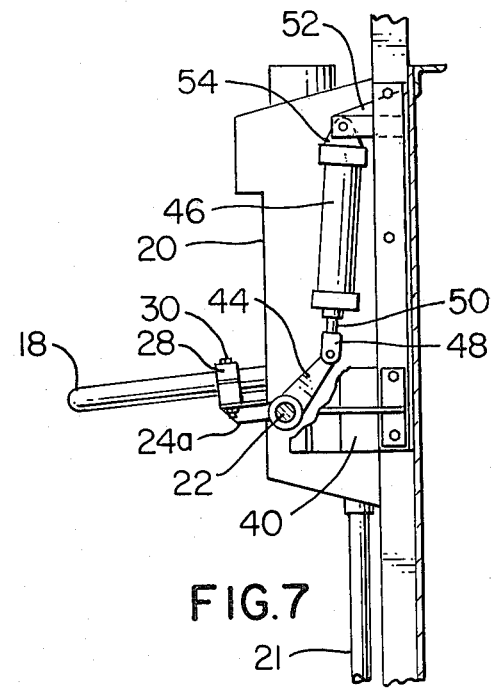
FIG. 7 is a side elevational view of the sterilization bar and sterilization cabinet of FIGS. 1-4 depicting an activating mechanism for rotating the actuating shaft.

FIGS. 2 and 7 illustrate the manner in which the electrical stimulation or contact bar 18 of the illustrated embodiment is moved between first and second positions. The actuating shaft 22 is supported on its end portions by bearings 36 and 38 which are, in turn, supported upon the sidewalls 14 by bearing brackets 40 and 42 respectively. As best illustrated in FIG. 7, an actuating arm 44 is rigidly affixed to the actuating shaft 22 and (as seen in FIG. 2) disposed between the sterilization cabinet 20 and the bearing 36. A fluid actuating cylinder 46, an air cylinder in the preferred embodiment, is pivotally jointed to the actuating arm 44 through a clevis 48 affixed to the end of a rod 50 extending from the piston 46. The back end of the cylinder 46, opposite from the end through which piston rod 50 extends is pivotally attached to a cylinder bracket 52 through the agency of a clevis mounting 54. As apparent from the illustration of FIG. 7, when the air piston 46 is actuated to extend the piston rod 50, a force, non-coincident with the rotational axis of actuating shaft 22, is applied to the actuating arm 44 to urge the arm 44 counter-clockwise as viewed in FIG. 7. Since the actuating arm 44 is rigidly attached to the actuating shaft 22 the shaft 22 is similarly rotated counter-clockwise. As apparent to those of ordinary skill in the art, this air cylinder 46 is utilized to move the electrical simulation or contact bar 18 between the first and second positions mentioned above.

Figure 8:
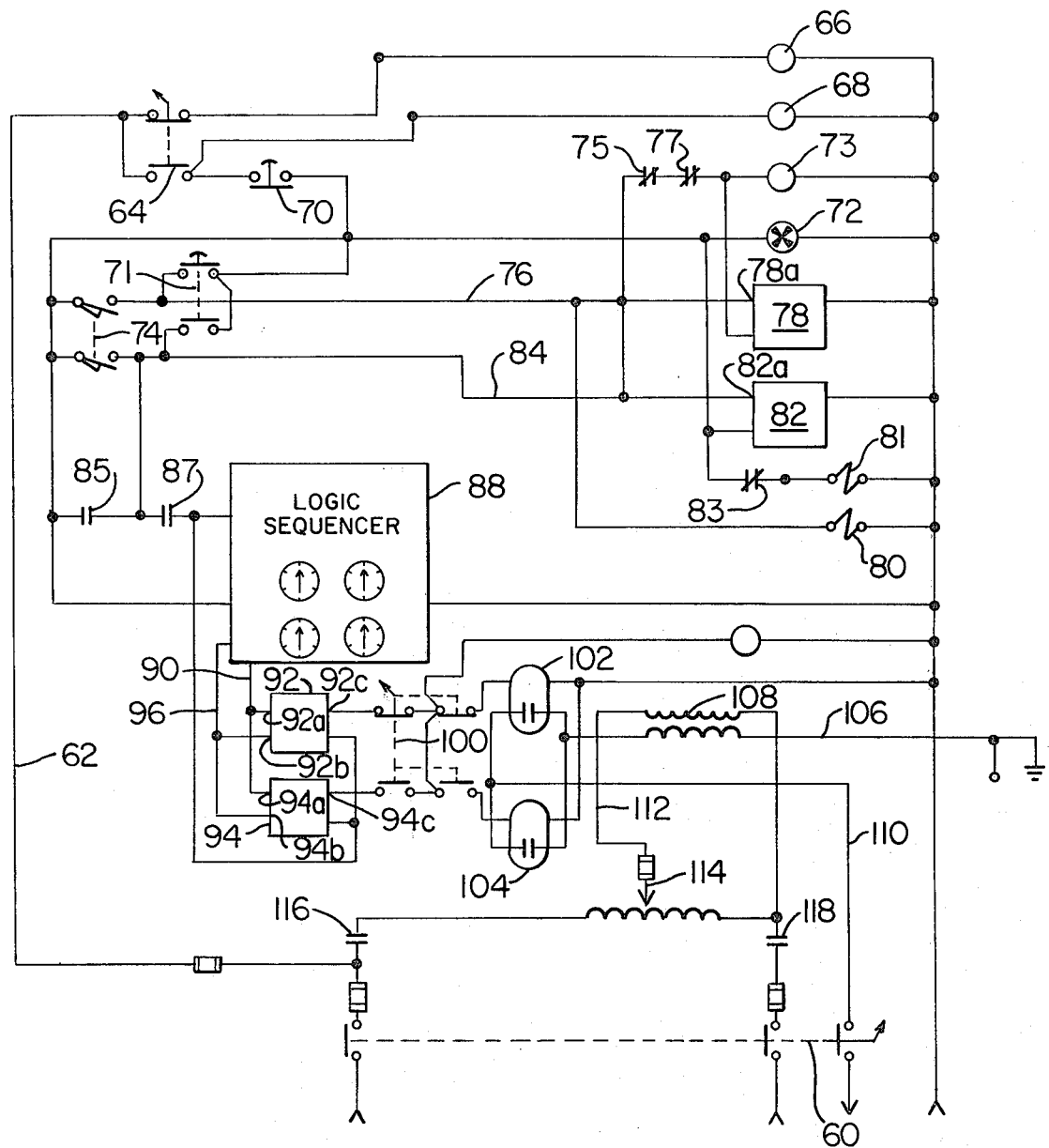
FIG. 8 is a schematic diagram of a control circuit for the apparatus of FIGS. 1-7.

FIG. 8 illustrates a control circuit for the apparatus of FIGS. 1-7. This control unit has a main disconnect switch 60 which is moved to the "on" position whenever it is desired to operate the electrical stimulation apparatus of FIGS. 1-7. Movement of this main disconnect switch 60 to the "on" position supplies 110 volts to a key lock switch 64 along line 62. The key lock switch 64 is initially in the "off" position illustrated in the depiction of FIG. 8. In this position, the electrical current is applied to a power off light 66 which is colored green in the physical embodiment. The power off light 66, which is also shown on FIGS. 3 and 4 mounted upon end wall 15, indicates that power is connected to the apparatus but that it is not being applied to the operative elements thereof.

Once the key switch 64 is turned to the "on" position, the green light 66 goes out and a red light 68 is turned on. This red light 68 is positioned immediately beneath the green light 66 in FIGS. 3 and 4, and when lit, indicates that power may be applied to the electrical stimulation bar 18. A push-pull switch 70 is also provided. When the switch 70 is closed, power is applied to a fan 72 into a trolley actuated switch 74 and the apparatus is ready to accept an animal carcass for stimulation. A test switch 71 is also provided to manually test the circuit.

When a trolley suspended carcass is transported along track 12 to a predetermined location, the trolley actuated switch 74 (see FIG. 2 also) is closed and power is applied along line 76 to a first input 78a of a timed solid-state relay 78 and to a "bar out" solenoid 80. The "bar out" solenoid 80 is associated with the air cylinder 46 (FIG. 7) and when the solenoid 80 is energized, the cylinder 46 is retracted to move the stimulation or contact bar 18 to the first or extended position illustrated in FIGS. 2, 3 and 7. At the same time, the energization of solid-state relay 78 opens normally closed contacts 83 to de-energize "bar in" solenoid 81. When energized, solenoid 81 moves the stimulation bar 18 to the second or retracted position in which the stimulation or contact bar 18 is disposed within the sterilization chamber 20.

A solid-state relay 82 is also energized by the closing of the trolley actuating switch 74 by current applied to input 82a through line 84. Current is also directed to a control relay 73 through normally closed contacts 75 and 77. The normally closed contacts 75 and 77 are associated with photo-sensors (not shown) which are on opposite sides of the apparatus. If an object breaks the light path of either of these photo-sensors, the pulsing apparatus is disabled. Relay 84 has a build in delay which delays the energization of the relay 82 for approximately five to six seconds. This delay permits the stimulation or contact bar 18 to reach its first or extended position in contacting relationship with an animal carcass prior to the application of electrical energy to stimulation bar 18.

Normally open contacts 85 and 87 are associated with solid-state relays 78 and 82 respectively and serve to establish an electrical path for the application of current to a logic sequencer 88 when the both of the relays are energized. The logic sequencer 88 is a timer which times both the duration of its 5 volt d.c. output pulse and the intervals between these output pulses. The output pulses from the logic sequencer 88 are applied through a line 90 to a pair of solid-state relays 92 and 94 at respective inputs 92a and 94a. The logic sequencer 88 is a commercially available unit and may be any of several available types (as for example the CARD-LOCK models currently available from The Allen Bradley Company of Milwaukee, Wis.). The logic sequencer 88 applies a 5 volt d.c. electrical pulse of variable duration to the inputs 92a and 94a to energize the respective solid-state relays. These impulses energize the relays 92 and 94 to electrically connect a 110 volt power applied to inputs 92b and 94b along line 96 from the logic sequencer 88.

Depending upon the position of a selector switch 100 either relay output 92c will be applied to mercury relay 102 or relay output 94c will be applied to mercury relay 104. Activation of either of the mercury relays 102 or 104 will energize a ground leg 106 of a 10 KVA transformer 108 including a transformer output leg 110 which produces an output voltage of approximately 700 volts. The transformer 108 receives an input on leg 112 from a variable input 114 connected to the power supply by a pair of normally open contacts 116 and 118 which are closed by the control relay 73. The transformer output leg 110 thus supplies a stepped up impulse voltage of between approximately 700 volts which is applied to the stimulation or contact bar 18. An output from either of the relays 92 or 94 also illuminates red light 101 which flashes in accordance to the pulse output of logic sequencer 88. The light 101 is also illustrated in FIGS. 3 and 4.

As appreciated by those skilled in the art, the electrical circuitry depicted in FIG. 8 steps up a low voltage output of approximately 5 volts d.c. which is output from the logic sequencer 88 and input to the solid-state relays 92 and 94 to a 110 volt output which is output from these solid-state relays 92 and 94. The output of these solid-state relays 92 and 94 is then stepped up via the mercury relays which are mercury damped for high voltage in order to prevent arcing, to a high voltage of approximately 700 volts which is applied to the stimulation or contact bar 18. It will also be appreciated that the solid-state relays 92 and 94 and mercury relays 102 and 104 and their corresponding connections are redundant. When both of these systems are used, one serves as a backup or spare circuit.

In operation, after the main disconnect switch 60, key switch 64 and push-pull switch 70 are closed, the carcass is transported along the predetermined path defined by the track 12 by well-known means (gravity, air cylinder, conveyor, etc.) to a predetermined location defined by the trolley actuated switch 74. When the carcass (carried by a trolley) reaches the predetermined location, current carried by line 76 is applied to inputs 78a and 82a of solid-state relays 78 and 82. Current is also applied to a "bar out" solenoid 80 which actuates the air cylinder 46.

The timing clock in solid-state relay 82 delays the energization of that relay to allow time for the stimulation of the contact bar 18 to reach the first or extended position in contacting relationship with the animal carcass. As soon as the timing clock in relay 82 times out, power is applied to the logic sequencer 88 which controls the pulsing which goes to the transformer 108.

The relay 78 also has a timing clock which is set for the desired duration of the pulsing sequencer. In the preferred embodiment, the pulsing sequence is set for approximately 45 seconds in three second cycles, two seconds of pulsing and one second of relaxation. When the timer in relay 78 times out, relay 78 de-energizes and normally closed contacts 83 are closed and the pulsing is terminated.

It should be that the animal carcasses may be transported along the predetermined path defined by track 12 continuously or intermittently. If a continuous movement is used, a stimulation bar which extends along the predetermined path for approximately six feet will generally be sufficient to handle 60 to 70 carcasses per hour, with each of the carcasses being exposed to the stimulation bar for approximately 45 seconds. It is, of course, necessary to space the carcass by a distance which is greater than the length of the stimulation bar to avoid having the bar contact two carcasses simultaneously.

If the animal carcasses are moved intermittently, the length of the bar can be shortened considerably as the residence time for the carcasses on the bar is not affected by movement. A typical length of a stimulation bar for an intermittent carcass movement would be three feet.

The muscles in the animal carcass are contracted by the electrical impulse. It has been found the best results are obtained when a voltage of approximately 600 volts is intermittently applied to the carcass causing it to contract and contort. These intermittent electrical pulses should be spaced by periods of relaxation.

The electrical stimulation of the carcass expends the latent energy in the muscles, nerves, and tissues. Consequently when cooled rapidly as is desired for quality control, muscles will not shorten and the toughness that results from the shortening will be prevented.

Additionally, the process of electrical stimulation causes a conversion of sugar molecules present in the muscle tissue to lactic acid. The same process occurs in living tissue but the acid is carried away in the blood stream while the animal is living. Lactic acid conversion releases certain enzymes which promote tenderness. Thus, electrical stimulation produces a rapid excelleration of the natural meat tenderization by its own enzymes.

The stimulus of electrical pulsation applied to an animal carcass will also draw up the pH level of a beef carcass from 7.1 to 5.6 within one and one half hours as compared to approximately 24 hours in other conventional methods, and this rapid decline in PH will accelerate the aging process.

The use of the contact bar in applicant's present invention is also advantageous in that it permits stimulation of the breast portion of the carcass. Since the carcass contorts under the impetus of the electrical stimulation, other types of application to this portion of the animal carcass have been hindered by the front legs of the carcass which are jerked upwardly when electrical pulses are applied to the breast portion. Applicant's invention however suffers no dilatorious drawbacks in this regard. If the legs are jerked upwardly, they merely engage the contact bar 18 tending to move it upwardly. This upward movement is however dampened by the actuation cylinder 46 which in the preferred embodiment is controlled by air, a compressible fluid. The air compresses when the legs of the animal carcass are jerked into the stimulation bar 18 and the air cylinder 46 functions as a shock absorber, preventing damage to the apparatus.

Thus it is apparent and has been provided, in accordance with the invention, a method and apparatus which fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. An apparatus for applying an electrical stimulation to an animal carcass, comprising:
   (a) a base;
   (b) a transport mechanism operative to move an animal carcass along a predetermined path relative to said base;
   (c) a sterilization chamber mounted upon said base;
   (d) an elongated electrical stimulation bar extending substantially in the direction of said predetermined path and pivotally mounted with respect to said sterilization chamber for movement about an axis non-coincident to said elongated bar and substantially parallel to said predetermined path between a first position in which the stimulation bar extends along the predetermined path for contact with an animal carcass and a second position in which the stimulation bar is disposed within the sterilization chamber; and
   (e) means for moving the stimulation bar between the first and second positions.

2. An apparatus as recited in claim 1 wherein the stimulation bar is moved between first and second positions by rotation about an elongated actuating shaft.

3. An apparatus as recited in claim 2 wherein the stimulation bar is electrically insulated from the actuating shaft.

4. An apparatus as recited in claim 2 wherein said stimulation bar is moved from the second position to the first position in response to positioning of an animal carcass at a predetermined location along the predetermined path.

5. An apparatus as recited in claim 1 further including means for applying electrical energy to the stimulation bar.

6. An apparatus as recited in claim 5 wherein the means for applying electrical energy to the stimulation is responsive to the position of an animal carcass along the predetermined path.

7. An apparatus as recited in claim 1 wherein the means for moving the stimulation bar includes a fluid cylinder.

8. An apparatus as recited in claim 7 wherein the fluid cylinder is an air cylinder.

9. An apparatus as recited in claim 5 wherein the means for applying electrical energy to the animal carcass includes means to intermittently apply electrical pulses.

10. An apparatus as recited in claim 1 wherein the stimulation bar is elongated and extends in a direction substantially parrallel to the predetermined path.

* * * * *